United States Patent
Zhu

(10) Patent No.: US 10,194,399 B2
(45) Date of Patent: Jan. 29, 2019

(54) ADJUSTING SMALL CELL TRANSMIT POWER ACCORDING TO LOAD AND TRANSMIT POWER OF OTHER SMALL CELLS

(71) Applicant: Yulong Computer Telecommunication Scientific (Shenzhen) Co., Ltd., Shenzhen, Guangdong (CN)

(72) Inventor: Yajun Zhu, Guangdong (CN)

(73) Assignee: Nanchang Coolpad Intelligent Technology Company Limited, Nanchang, Jiangxi (CN)

(*) Notice: Subject to any disclaimer, the term of this patent is extended or adjusted under 35 U.S.C. 154(b) by 0 days.

(21) Appl. No.: 15/431,322

(22) Filed: Feb. 13, 2017

(65) Prior Publication Data

US 2017/0156117 A1    Jun. 1, 2017

Related U.S. Application Data

(63) Continuation-in-part of application No. PCT/CN2014/095986, filed on Dec. 31, 2014.

(30) Foreign Application Priority Data

Nov. 28, 2014    (CN) .......................... 2014 1 0706285

(51) Int. Cl.
*H04W 52/04*    (2009.01)
*H04W 52/38*    (2009.01)
(Continued)

(52) U.S. Cl.
CPC ....... *H04W 52/143* (2013.01); *H04W 52/243* (2013.01); *H04W 52/343* (2013.01); *H04W 52/38* (2013.01); *H04W 84/045* (2013.01)

(58) Field of Classification Search
CPC . H04W 52/343; H04W 84/045; H04W 24/02; H04W 52/143; H04W 28/08;
(Continued)

(56) References Cited

U.S. PATENT DOCUMENTS

2004/0203688 A1    10/2004    Backes et al.
2007/0253385 A1    11/2007    Li et al.
(Continued)

FOREIGN PATENT DOCUMENTS

CN    102137480 A    7/2011
CN    103024835 A    4/2013
(Continued)

OTHER PUBLICATIONS

Extended European Search Report dated Jan. 4, 2018 in corresponding EP Application No. 14907156.5.

*Primary Examiner* — Philip Sobutka
(74) *Attorney, Agent, or Firm* — Young Basile Hanlon & MacFarlane, P.C.

(57) ABSTRACT

A method for adjusting transmission power of a small cell, a system for adjusting transmission power of a small cell, and a small cell include acquiring transmission power of other small cells when downlink data needs to be transmitted; and adjusting transmission power for transmitting the downlink data according to a load state of the small cell and the transmission power of the other small cells.

15 Claims, 7 Drawing Sheets

(51) Int. Cl.
*H04W 52/14* (2009.01)
*H04W 52/24* (2009.01)
H04W 84/04 (2009.01)
H04W 52/34 (2009.01)

(58) Field of Classification Search
CPC .......... H04W 52/0206; H04W 72/082; H04W 24/10; H04W 52/18; H04W 52/04; H04W 16/26; H04W 24/08; H04W 52/0216; H04W 52/34; H04W 52/38
USPC ....................................................... 455/522
See application file for complete search history.

(56) References Cited

U.S. PATENT DOCUMENTS

| | | |
|---|---|---|
| 2012/0108249 A1 | 5/2012 | Talwar et al. |
| 2012/0258764 A1 | 10/2012 | Asaoka et al. |
| 2013/0102309 A1 | 4/2013 | Chande et al. |
| 2013/0336188 A1* | 12/2013 | Yomo ............... H04W 52/0206 370/311 |
| 2015/0189548 A1* | 7/2015 | Ahmad ................ H04W 28/08 370/235 |

FOREIGN PATENT DOCUMENTS

| | | |
|---|---|---|
| CN | 103024885 A | 4/2013 |
| CN | 103249128 A | 8/2013 |
| WO | 2010077193 A1 | 7/2010 |

* cited by examiner

ADJUSTING SMALL CELL TRANSMIT POWER ACCORDING TO LOAD AND TRANSMIT POWER OF OTHER SMALL CELLS

CROSS-REFERENCE TO RELATED APPLICATION(S)

This application is a continuation in part of international Patent Application PCT No. PCT/CN2014/095986 filed on Dec. 31, 2014, which claims priority to Chinese Patent Application No. 201410706285.0 filed on Nov. 28, 2014, the contents of which are hereby incorporated by reference in their entireties.

TECHNICAL FIELD

The present disclosure relates to the technical field of communications, and in particular, to a method for adjusting transmission power of a small cell, a system for adjusting transmission power of a small cell, and a small cell.

BACKGROUND

With increase of business demand, the data rate of wireless transmission needs to be improved instantly. In the present study, the gain of cell splitting is obtained by introducing low power nodes, thereby increasing the data rate and the coverage of hot spots. However, with the densification of network nodes, the interference between the nodes has become a bottleneck of limiting network performance. Also, a great number of network nodes result in increase of power consumption, which brings a great challenge for operation costs of operators.

To avoid the mutual interference between the low power nodes, and also reduce power consumption of the low power nodes, a lot of work has done in 3GPP. For example, in Rel-10/11, the eICIC/FeICIC technology is provided to avoid the interference between the low power node and a macro base station. The mutual interference is avoided by introducing almost blank subframe (ABS) concept. However, in the technical solution, the transmission of remaining of the ABS can continue to bring interference. Furthermore, in the study of Rel-12, to avoid the interference between small cells, a concept of small cell on/off is provided, and the interference avoidance and power conservation can be realized by semi-statically turning off some small cells. However, turning off the small cells may bring influence for exiting users.

However, how to avoid the interference between small cells while high quality service for users is ensured has become a technical problem which needs to be solved instantly.

SUMMARY

Based on at least one of the above technical solutions, a new solution for adjusting transmission power of a small cell is provided. By means of the solution, the interference between the small cell and other small cells can be effectively avoided while high quality service for loads is ensured.

In view of this, in the present disclosure, a method for adjusting transmission power of a small cell comprises: acquiring transmission power of other small cells when downlink data needs to be transmitted; and adjusting transmission power for transmitting the downlink data according to a load state of the small cell and the transmission power of the other small cells.

In the technical solution, when the downlink data needs to be transmitted, the transmission power for transmitting the downlink data is adjusted according to the load state of the small cell and the transmission power of the other small cells, thus according to the load state of the small cell, the transmission power can be adjusted to fall into a range, and when the transmission power falls into the range, load requirements can be satisfied, accordingly high quality service for the loads can be ensured. Also, according to the transmission power of the other small cells, the transmission power for transmitting the downlink data can be adjusted to fall into a range, and when the transmission power falls into the range, the interference for the other small cells is least, thus the interference between small cells can be effectively avoided while high quality service for the loads is ensured.

In the above technical solution, preferably, the method further comprises: adjusting the transmission power for transmitting the downlink data according to a power adjusting request upon receiving the power adjusting request from the other small cells; and/or transmitting a power adjusting request to the other small cells, so as to cause the other small cells to adjust the transmission power of the other small cells when the other small cells transmit downlink data.

In the technical solution, by receiving the power adjusting request from the other small cells, the transmission power is adjusted, thus the transmission power can be adjusted properly under control of the other small cells, so as to reduce the interference for the other small cells. Similarly, by transmitting the power adjusting request to the other small cells, the other small cells can be controlled to adjust the transmission power properly, thus the mutual interference can be also reduced.

In the above technical solution, preferably, the method further comprises: detecting a change of the load state of the small cell in real time; and adjusting the transmission power for transmitting the downlink data according to the change of the load state.

In the technical solution, during a work process of the small cell, the loads within the service range may change, thus by adjusting the transmission power according to the change of the load state, the transmission power can be increased properly when service demand of the loads is great, the number of the loads increases, or a distance between each load and the small cell is long, so as to ensure the service quality for the loads. Also, the transmission power can be reduced properly when the service demand of the loads is less, the number of the loads decreases, or the distance between each load and the small cell is short, so as to avoid the interference for the other small cells, and reduce power consumption of the small cell.

In the above technical solution, preferably, when the small cell is in an off state, upon receiving an instruction for switching to an on state by a wireless interface and/or a wired interface, it is determined that the downlink data needs to be transmitted.

In the above technical solution, preferably, the load state comprises service demand of the loads, positions of the loads within coverage of the small cell, and the number of the loads.

In the above technical solution, preferably, the method further comprises: informing the loads of the adjusted transmission power by transmitting system information, RRC signaling, medium access control element signaling or physical layer signaling; and/or informing the other small cells of the adjusted transmission power according to backhaul.

In the technical solution, by informing the loads of the adjusted transmission power, the loads can adjust received power adaptively, so as to cause the received power to match with the transmission power of the small cell. By informing the other small cells of the adjusted transmission power, the other small cells can correspondingly adjust their transmission power, thus the interference between small cells can be effectively avoided while high quality service for the loads is ensured.

According to another aspect of the present disclosure, a system for adjusting transmission power of a small cell is further provided. The system comprises: an acquiring unit configured to acquire transmission power of other small cells when downlink data needs to be transmitted, and an adjusting unit configured to adjust transmission power for transmitting the downlink data according to a load state of the small cell and the transmission power of the other small cells.

In the technical solution, when the downlink data needs to be transmitted, the transmission power for transmitting the downlink data is adjusted according to the load state of the small cell and the transmission power of the other small cells, thus according to the load state of the small cell, the transmission power can be adjusted to fall into a range, and when the transmission power falls into the range, load requirements can be satisfied, accordingly high quality service for the loads can be ensured. Also, according to the transmission power of the other small cells, the transmission power for transmitting the downlink data can be adjusted to fall into a range, and when the transmission power falls into the range, the interference for the other small cells is least, thus the interference between small cells can be effectively avoided while high quality service for the loads is ensured.

In the above technical solution, preferably, the system further comprises a receiving unit and/or a transmitting unit. The receiving unit is configured to receive a power adjusting request from the other small cells. The adjusting unit is further configured to adjust the transmission power for transmitting the downlink data according to the power adjusting request received by the receiving unit. The transmitting unit is configured to transmit a power adjusting request to the other small cells, so as to cause the other small cells to adjust the transmission power of the other small cells when the other small cells transmit downlink data.

In the technical solution, by receiving the power adjusting request from the other small cells, the transmission power is adjusted, thus the transmission power can be adjusted properly under control of the other small cells, so as to reduce the interference for the other small cells. Similarly, by transmitting the power adjusting request to the other small cells, the other small cells can be controlled to adjust the transmission power properly, thus the mutual interference can be also reduced.

In the above technical solution, preferably, the system further comprises a detecting unit configured to detect a change of the load state of the small cell in real time. The adjusting unit is further configured to adjust the transmission power for transmitting the downlink data according to the change of the load state.

In the technical solution, during a work process of the small cell, the loads within the service range may change, thus by adjusting the transmission power according to the change of the load state, the transmission power can be increased properly when service demand of the loads is great, the number of the loads increases, or a distance between each load and the small cell is long, so as to ensure the service quality for the loads. Also, the transmission power can be reduced properly when the service demand of the loads is less, the number of the loads decreases, or the distance between each load and the small cell is short, so as to avoid the interference for the other small cells, and reduce power consumption of the small cell.

In the above technical solution, preferably, the system further comprises a determining unit configured to determine to transmit the downlink data upon receiving an instruction for switching to an on state via a wireless interface and/or a wired interface when the small cell is in an off state.

In the above technical solution, preferably, the load state comprises service demand of the loads, positions of the loads within coverage of the small cell, and the number of the loads.

In the above technical solution, preferably, the system further comprises an informing unit configured to inform the loads of the adjusted transmission power by transmitting system information, RRC signaling, medium access control element signaling or physical layer signaling, and/or inform the other small cells of the adjusted transmission power according to backhaul.

In the technical solution, by informing the loads of the adjusted transmission power, the loads can adjust received power adaptively, so as to cause the received power to match with the transmission power of the small cell. By informing the other small cells of the adjusted transmission power, the other small cells can correspondingly adjust their transmission power, thus the interference between small cells can be effectively avoided while high quality service for the loads is ensured.

According to yet another aspect of the present disclosure, a small cell is further provided. The small cell comprises a system for adjusting transmission power of the small cell described in any of the above technical solutions. Specifically, the small cell is a low power wireless access point, which can be realized by a device having a wireless reception and transmission function, for example, a smart terminal (e.g., a smart phone).

By means of the above technical solution, the interference between the small cell and the other small cells can be effectively avoided while high quality service for the loads is ensured.

DETAILED DESCRIPTION

To understand the above-mentioned purposes, features and advantages of the present disclosure more clearly, the present disclosure will be further described in detail below in combination with the accompanying drawings and the specific implementations. It should be noted that, the implementations of the present application and the features in the implementations may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific implementations disclosed below.

Figure 1:
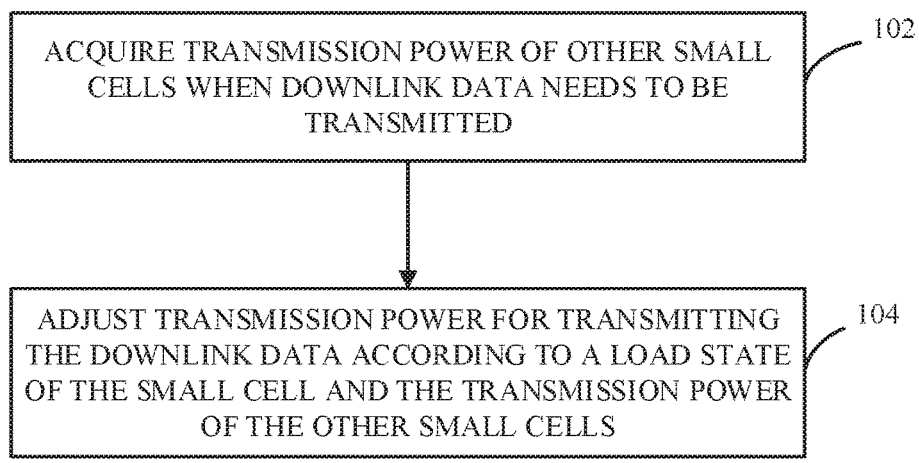
FIG. 1 is a schematic flow chart of a method for adjusting transmission power of a small cell in accordance with an implementation of the present disclosure.

FIG. 1 is a schematic flow chart of a method for adjusting transmission power of a small cell in accordance with an implementation of the present disclosure.

As illustrated by FIG. 1, a method for adjusting transmission power of a small cell in accordance with an implementation of the present disclosure includes: step 102, acquiring transmission power of other small cells when downlink data needs to be transmitted; step 104, adjusting transmission power for transmitting the downlink data according to a load state of the small cell and the transmission power of the other small cells.

In the technical solution, when the downlink data needs to be transmitted, the transmission power for transmitting the downlink data is adjusted according to the load state of the small cell and the transmission power of the other small cells, thus according to the load state of the small cell, the transmission power can be adjusted to fall into a range, and when the transmission power falls into the range, load requirements can be satisfied, accordingly high quality service for the loads can be ensured. Also, according to the transmission power of the other small cells, the transmission power for transmitting the downlink data can be adjusted to fall into a range, and when the transmission power falls into the range, the interference for the other small cells is least, thus the interference between small cells can be effectively avoided while high quality service for the loads is ensured.

In the technical solution, preferably, the method further includes: adjusting the transmission power for transmitting the downlink data according to a power adjusting request upon receiving the power adjusting request from the other small cells; and/or transmitting a power adjusting request to the other small cells, so as to cause the other small cells to adjust the transmission power of the other small cells when the other small cells transmit downlink data.

In the technical solution, by receiving the power adjusting request from the other small cells, the transmission power is adjusted, thus the transmission power can be adjusted properly under control of the other small cells, so as to reduce the interference for the other small cells. Similarly, by transmitting the power adjusting request to the other small cells, the other small cells can be controlled to adjust the transmission power properly, thus the mutual interference can be also reduced.

In the above technical solution, preferably, the method further includes: detecting a change of the load state of the small cell in real time; and adjusting the transmission power for transmitting the downlink data according to the change of the load state.

In the technical solution, during a work process of the small cell, the loads within the service range may change, thus by adjusting the transmission power according to the change of the load state, the transmission power can be increased properly when service demand of the loads is great, the number of the loads increases, or a distance between each load and the small cell is long, so as to ensure the service quality for the loads. Also, the transmission power can be reduced properly when the service demand of the loads is less, the number of the loads decreases, or the distance between each load and the small cell is short, so as to avoid the interference for the other small cells, and reduce power consumption of the small cell.

In the above technical solution, preferably, when the small cell is in an off state, upon receiving an instruction for switching to an on state via a wireless interface and/or a wired interface, it is determined that the downlink data needs to be transmitted.

In the above technical solution, preferably, the load state includes service demand of the loads, positions of the loads within coverage of the small cell, and the number of the loads.

In the above technical solution, preferably, the method further includes: informing the loads of the adjusted transmission power by transmitting system information, RRC signaling, medium access control element signaling or physical layer signaling; and/or informing the other small cells of the adjusted transmission power according to backhaul.

In the technical solution, by informing the loads of the adjusted transmission power, the loads can adjust received power adaptively, so as to cause the received power to match with the transmission power of the small cell. By informing the other small cells of the adjusted transmission power, the other small cells can correspondingly adjust their transmission power, thus the interference between small cells can be effectively avoided while high quality service for the loads is ensured.

Figure 2:
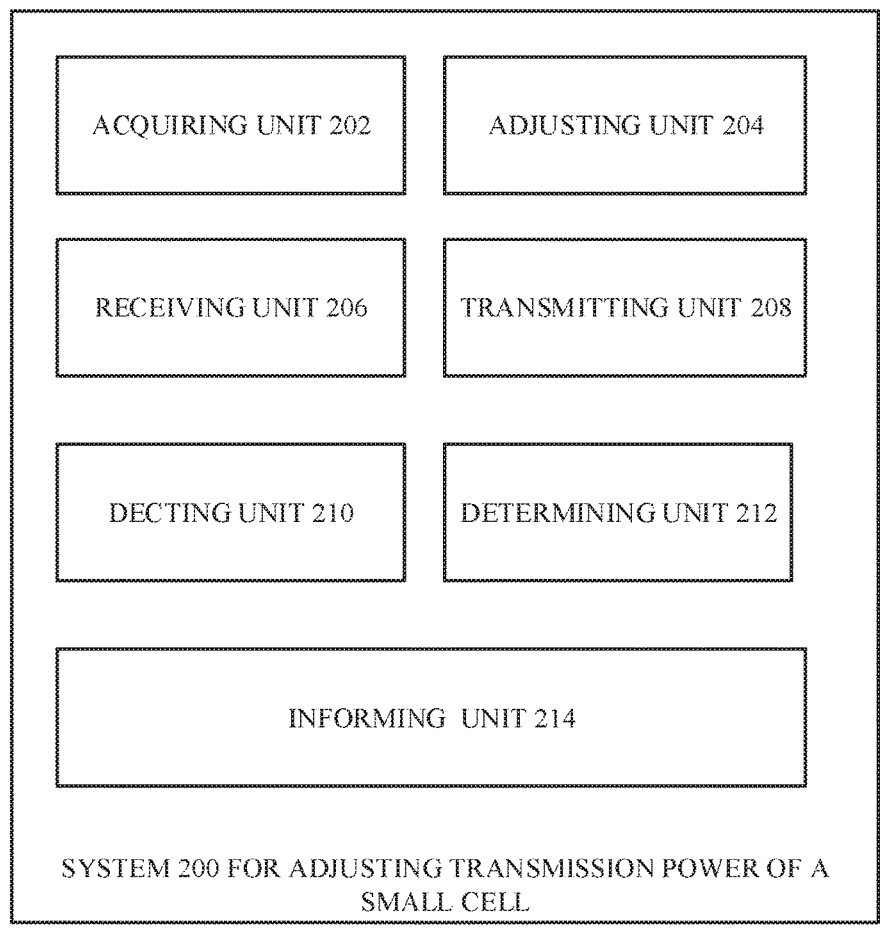
FIG. 2 is diagrammatic view of a system for adjusting transmission power of a small cell in accordance with an implementation of the present disclosure.

FIG. 2 is block diagram of a system for adjusting transmission power of a small cell in accordance with an implementation of the present disclosure.

As illustrated by FIG. 2, a system 200 for adjusting transmission power of a small cell in accordance with an implementation of the present disclosure includes an acquiring unit 202 configured to acquire transmission power of other small cells when downlink data needs to be transmitted, and an adjusting unit 204 configured to adjust transmission power for transmitting the downlink data according to a load state of the small cell and the transmission power of the other small cells.

In the technical solution, when the downlink data needs to be transmitted, the transmission power for transmitting the downlink data is adjusted according to the load state of the small cell and the transmission power of the other small cells, thus according to the load state of the small cell, the transmission power can be adjusted to fall into a range, and when the transmission power falls into the range, load requirements can be satisfied, accordingly high quality service for the loads can be ensured. Also, according to the transmission power of the other small cells, the transmission power for transmitting the downlink data can be adjusted to fall into a range, and when the transmission power falls into the range, the interference for the other small cells is least, thus the interference between small cells can be effectively avoided while high quality service for the loads is ensured.

In the above technical solution, preferably, the system 200 further includes a receiving unit 206 and/or a transmitting unit 208. The receiving unit 206 is configured to receive a power adjusting request from the other small cells. The adjusting unit 204 is further configured to adjust the transmission power for transmitting the downlink data according to the power adjusting request received by the receiving unit 206. The transmitting unit 208 is configured to transmit a power adjusting request to the other small cells, so as to cause the other small cells to adjust the transmission power of the other small cells when the other small cells transmit downlink data.

In the technical solution, by receiving the power adjusting request from the other small cells, the transmission power is adjusted, thus the transmission power can be adjusted properly under control of the other small cells, so as to reduce the interference for the other small cells. Similarly, by transmitting the power adjusting request to the other small cells, the other small cells can be controlled to adjust the transmission power properly, thus the mutual interference can be also reduced.

In the above technical solution, preferably, the system 200 further includes a detecting unit 210 configured to detect a change of the load state of the small cell in real time. The adjusting unit 204 is further configured to adjust the transmission power for transmitting the downlink data according to the change of the load state.

In the technical solution, during a work process of the small cell, the loads within the service range may change, thus by adjusting the transmission power according to the change of the load state, the transmission power can be increased properly when service demand of the loads is great, the number of the loads increases, or a distance between each load and the small cell is long, so as to ensure the service quality for the loads. Also, the transmission power can be reduced properly when the service demand of the loads is less, the number of the loads decreases, or the distance between each load and the small cell is short, so as to avoid the interference for the other small cells, and reduce power consumption of the small cell.

In the above technical solution, preferably, the system 200 further includes a determining unit 212 configured to determine to transmit the downlink data upon receiving an instruction for switching to an on state via a wireless interface and/or a wired interface when the small cell is in an off state.

In the above technical solution, preferably, the load state includes service demand of the loads, positions of the loads within coverage of the small cell, and the number of the loads.

In the above technical solution, preferably, the system 200 further includes an informing unit 214 configured to inform the loads of the adjusted transmission power by transmitting system information, RRC signaling, medium access control element signaling or physical layer signaling, and/or inform the other small cells of the adjusted transmission power according to backhaul.

In the technical solution, by informing the loads of the adjusted transmission power, the loads can adjust received power adaptively, so as to cause the received power to match with the transmission power of the small cell. By informing the other small cells of the adjusted transmission power, the other small cells can correspondingly adjust their transmission power, thus the interference between small cells can be effectively avoided while high quality service for the loads is ensured.

The present disclosure further provides a small cell which includes the system 200 for adjusting the transmission power of the small cell which is illustrated by FIG. 2. Specifically, the small cell is a low power wireless access point, which can be realized by a device having a wireless reception and transmission function, for example, a smart terminal (e.g., a smart phone).

Wherein, in the present disclosure, the power adjusting solution can adjust the transmission power during the work process of the small cell, and can also adjust the transmission power when the small cell is switched from the off state to the on state. The following will specifically illustrate the technical solution of the present disclosure under the condition of that the initial state of the small cell is the off state.

It should be noted that in the present disclosure the off state of the small cell can be illustrated by multiple manners. For example, in a first manner, the off state is a state under which the small cell transmits some signals in a long period to cause that a community can be discovered by a terminal. In a second manner, the off state is a state under which the small cell does not transmit any signal but needs to monitor transmission of surrounding terminals constantly or periodically. In a third manner, the off state is a state under which the small cell does not transmit any signal and does not monitor transmission of surrounding terminals, but the small cell needs to maintain interaction capability of backhaul.

When the small cell is in the off state, if the signaling through the air interface or the backhaul requires the small cell to enter the on state, the small cell needs to activate downlink transmission, and sets proper transmission power. In order to set the proper transmission power, the small cell needs to acquire the transmission condition of surrounding small cells which can be realized by two manners.

Manner 1: the small cell informs the surrounding small cells of the value of the transmission power via the backhaul signaling. The backhaul signaling can be a backhaul signaling defined by the present protocol, such as X2 or S1, and can also be a defined backhaul signaling defined by the subsequent protocol.

Manner 2: the small cell acts as a terminal to acquire the transmission power of the surrounding small cells via the air interface. For example, the small cell can acquire the downlink transmission power of the surrounding small cells by obtaining system information of the surrounding small cells.

After acquiring the power information of nearby small cells, the small cell can set self transmission power to serve users. A number of manners for setting power exist, for example, the small cell sets the self transmission power according to service level of the terminal.

During the work process of the small cell, the small cell can adjust the self downlink transmission power. For example, in an implementation of the present disclosure, after the small cell receives the request for adjusting power from the nearby small cells, the small cell can adjust the self transmission power according to the request. In another implementation, the small cell can adjust the self transmission power according to the positions of users served by the small cell or the change of service.

After the small cell adjusts the self transmission power, the small cell can inform the served users of the change of the self transmission power by system information, RRC signaling, medium access control (MAC) control element (CE), or physical layer signaling. Also, the small cell can inform the nearby small cells of the change of the self transmission power by backhaul signaling.

The following will specifically illustrate the technical solution of the present disclosure in combination with FIGS. 3-6.

Figure 3:
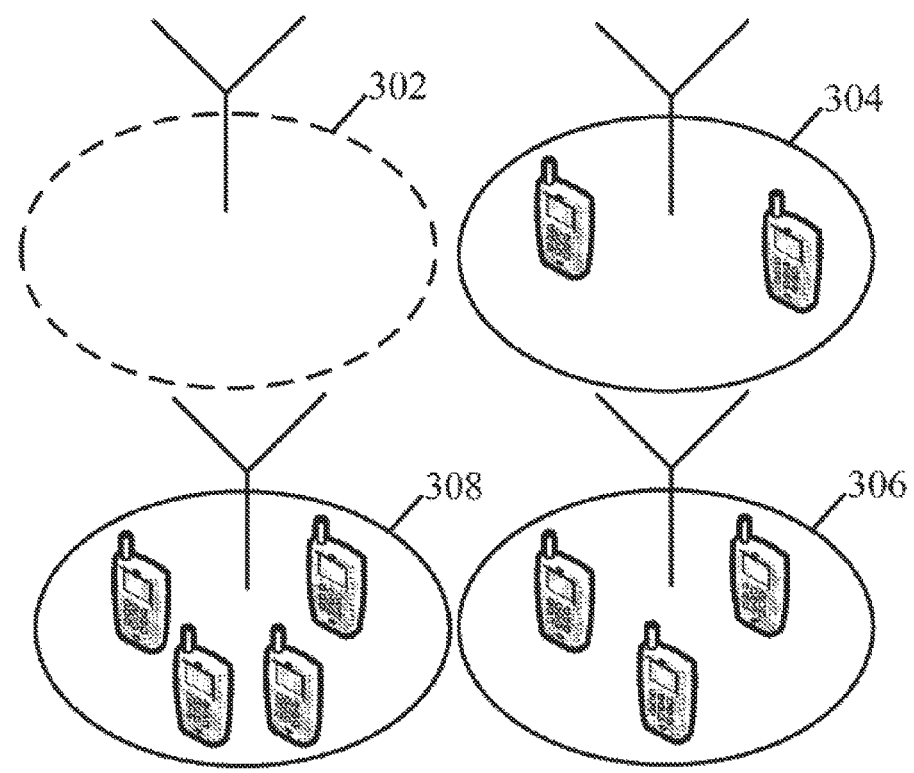
FIG. 3 is a schematic view of service status of multiple small cells in accordance with a first implementation of the present disclosure.

As shown in FIG. 3, a small cell 304, a small cell 306, and a small cell 308 are in the on state. To provide communication service for corresponding user equipments, the small cell 302 is in the off state.

When user equipment 310 enters the coverage of the small cell 302, to provide service for the user equipment 310, two methods are illustrated as following.

In a first manner, one other small cell, such as the small cell 304, the small cell 306, or the small cell 308 increases self transmission power to serve the user equipment 310. In this manner, the small cell 302 needs to request the small cell 304, the small cell 306, or the small cell 308 to increase the transmission power via signaling through backhaul. The setting of the transmission power can be realized by the base station or information from the terminal.

Figure 4:
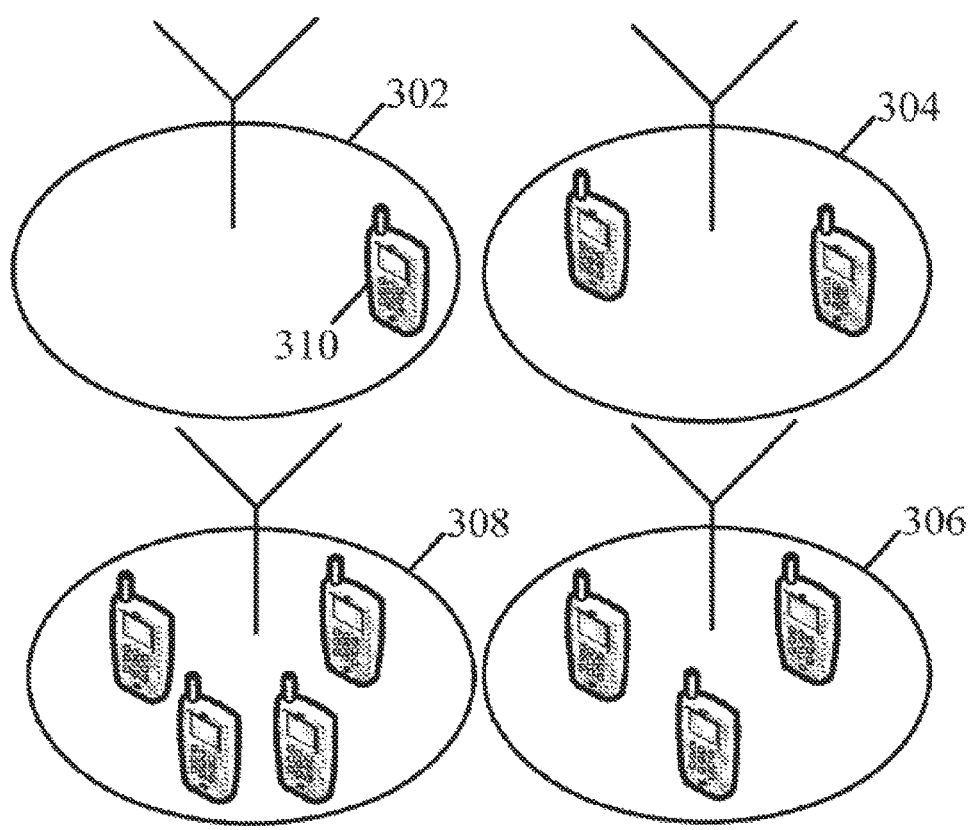
FIG. 4 is a schematic view of service status of multiple small cells in accordance with a second implementation of the present disclosure.

In a second manner, as illustrated by FIG. 4, the small cell 302 is awakened to serve the user equipment 310. The small cell 302 can determine to enter the on state by monitoring uplink transmission of the user equipment 310 or signaling interaction of the backhaul. After the small cell 302 is awakened, the small cell 302 determines the self transmission power by acquiring transmission power information of the nearby small cells and/or the uplink transmission of the user equipment 310, thus the mutual interference between the small cell 302 and the other small cells can be avoided while high quality service for the user equipment 310 is ensured.

Figure 5:
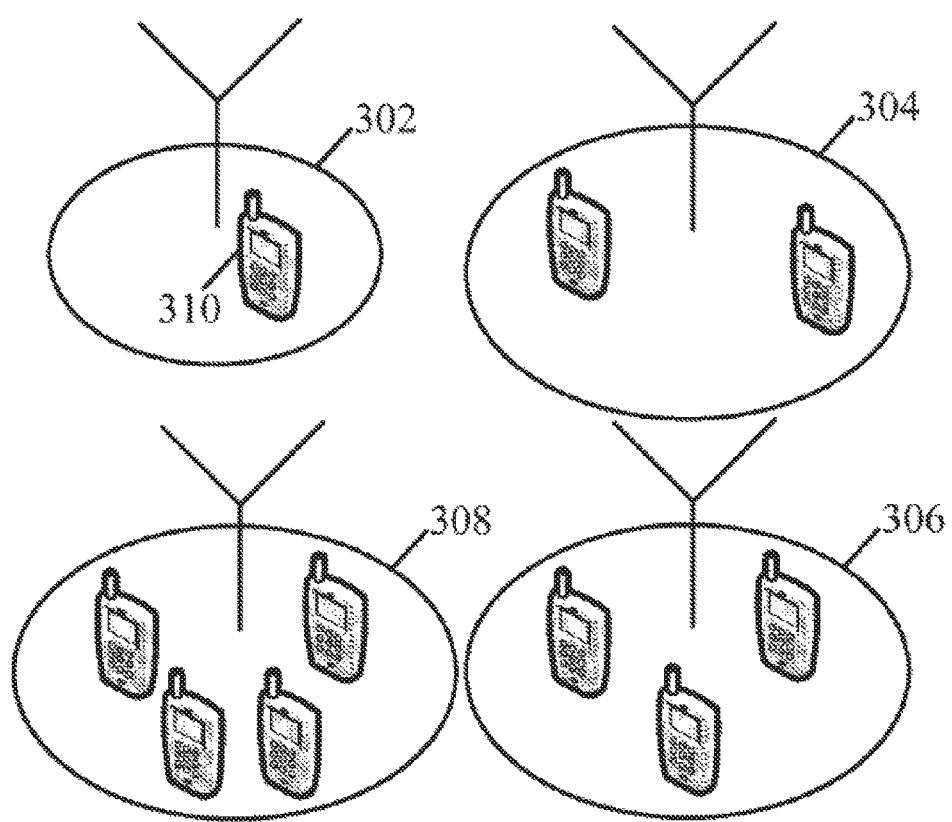
FIG. 5 is a schematic view of service status of multiple small cells in accordance with a third implementation of the present disclosure.

As illustrated by FIG. 5, when the user equipment 310 moves to the center of the coverage of the small cell 302 (the small cell 302 can acquire the position via information from the user equipment 310), the small cell 302 determines to reduce the self transmission power. The small cell 302 informs the served users (e.g., the user equipment 310) of the change of the self transmission power by transmitting system information, RRC signaling, MAC CE or physical layer signaling. Also, the small cell 302 can inform the small cell 304, the small cell 306, and the small cell 308 of the change of the self transmission power by backhaul signaling.

Figure 6:
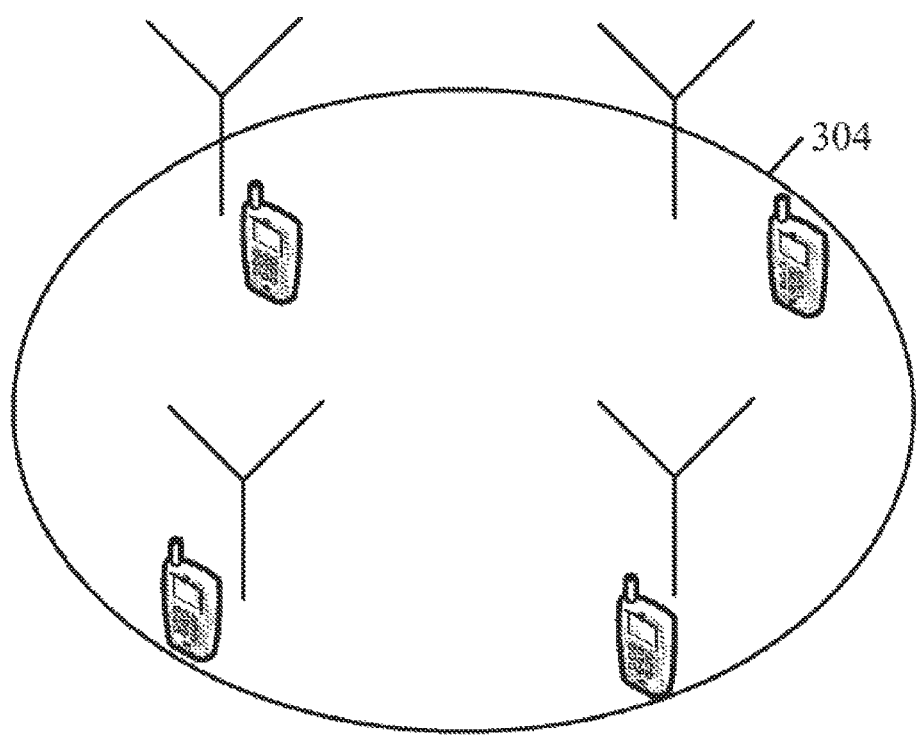
FIG. 6 is a schematic view of service status of multiple small cells in accordance with a fourth implementation of the present disclosure.

As illustrated by FIG. 6, when the number of users served by the small cell 302, the small cell 304, the small cell 306, and the small cell 308 reduces, or the service demand of the small cell 302, the small cell 304, the small cell 306, and the small cell 308 reduces, the small cell 302, the small cell 304, the small cell 306, and the small cell 308 can negotiate with each other to determine to increase the transmission power of the small cell 304 to serve all of users within the service region, and the small cell 302, the small cell 306, and the small cell 308 enter the off state to reduce the power consumption of the small cell 302, the small cell 306, and the small cell 308.

Figure 7:
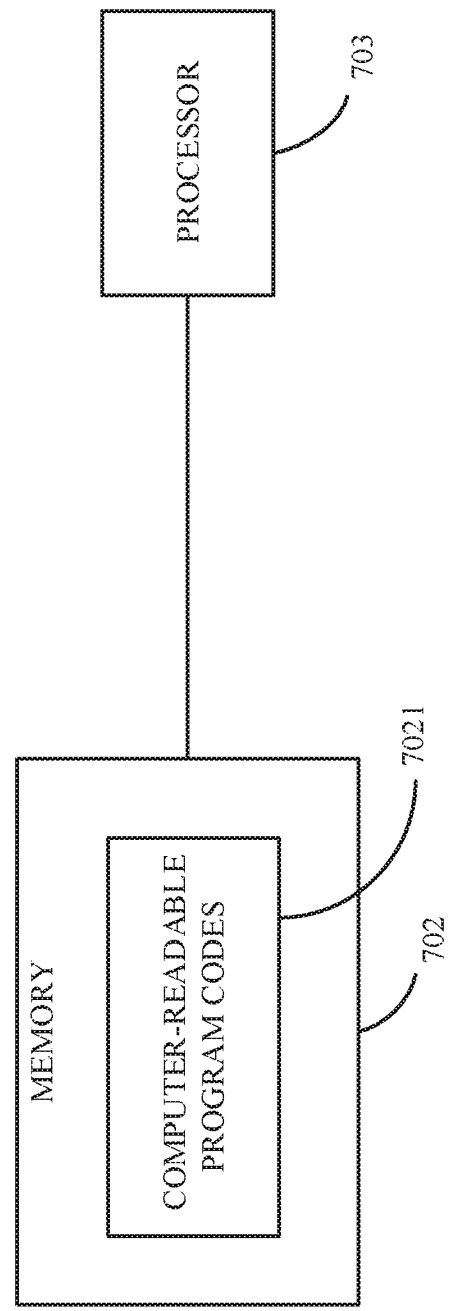
FIG. 7 is a diagrammatic view of a small cell in accordance with an implementation of the present disclosure.

FIG. 7 is a diagrammatic view of a small cell in accordance with an implementation of the present disclosure. The small cell can include but not limited to a memory 702 and a processor 704.

The memory 702 is configured to store a plurality of computer-readable program codes 7021. The memory 702 can be a read only memory (ROM), a random access memory (RAM), a U-disk, a removable hard disk, etc.

The processor 704 can include multiple cores for multi-thread or parallel processing. In this implementation, the processor 704 is configured to execute the plurality of computer-readable program codes 7021 to perform following operations: acquiring transmission power of other small cells when downlink data needs to be transmitted; and adjusting transmission power for transmitting the downlink data according to a load state of the small cell and the transmission power of the other small cells.

In at least one implementation, the plurality of computer-readable programs are further invoked by the processor to execute following operations: adjusting the transmission power for transmitting the downlink data according to a power adjusting request upon receiving the power adjusting request from the other small cells; and transmitting a power adjusting request to the other small cells, so as to cause the other small cells to adjust the transmission power of the other small cells when the other small cells transmit downlink data.

In at least one implementation, the plurality of computer-readable programs are further invoked by the processor to execute following operations: detecting a change of the load state of the small cell in real time; and adjusting the transmission power for transmitting the downlink data according to the change of the load state.

In at least one implementation, when the small cell is in an off state, upon receiving an instruction for switching to an on state by a wireless interface or a wired interface, it is determined that the downlink data needs to be transmitted.

In at least one implementation, the load state includes service demand of the loads, positions of the loads within coverage of the small cell, and the number of the loads.

In at least one implementation, the plurality of computer-readable programs are further invoked by the processor to execute following operations: informing the loads of the adjusted transmission power by transmitting system information, RRC signaling, medium access control element signaling or physical layer signaling; and informing the other small cells of the adjusted transmission power according to backhaul.

In the present disclosure, a machine-readable storage medium is further provided. The storage medium includes a plurality of computer readable program codes. The plurality of computer readable program codes are run in a small cell to execute the method for adjusting transmission power of the small cell described above, which will not be specifically described to avoid repetition.

The above specifically illustrates the technical solution of the present disclosure. The present disclosure provides a new solution for adjusting the transmission power of the small cell, and by means of the solution, the interference between the small cell and the other small cells can be effectively avoided while high quality service for loads is ensured.

The foregoing descriptions are merely preferred implementations of the present disclosure, but are not intended to limit the present disclosure. For those skilled in the art, various changes and variations can be made according to the present disclosure. Any modifications, equivalent replacements, and improvements within the spirit and principle of the technical solution should fall within the protection scope of the present disclosure.

What is claimed is:

1. A method for adjusting transmission power of a small cell, comprising:
   based on an instruction for switching from an off state to an on state by the small cell, determining that downlink data needs to be transmitted, wherein the off state comprises one of a first state, a second state, and a third state, wherein:

in the first state, the small cell transmits signals in a long period for a load to discover a community, in the second state, the small cell transmits no signal and monitors transmission of surrounding loads, and in the third state, the small cell transmits no signal, monitors no transmission of the surrounding loads, and maintains interaction capability of backhaul signaling;

based on a determination that the downlink data needs to be transmitted, acquiring transmission power of other small cells; and adjusting transmission power for transmitting the downlink data according to a load state of the small cell and the transmission power of the other small cells.

2. The method of claim 1, further comprising:

adjusting the transmission power for transmitting the downlink data according to a power adjusting request in response to receiving the power adjusting request from the other small cells; and transmitting a power adjusting request to the other small cells for adjusting the transmission power of the other small cells when the other small cells transmit other downlink data.

3. The method of claim 1, further comprising:

detecting a change of the load state of the small cell in real time; and adjusting the transmission power for transmitting the downlink data according to the change of the load state.

4. The method of claim 1, wherein the load state comprises service demand of loads, positions of the loads within coverage of the small cell, and the number of the loads.

5. The method of claim 1, further comprising:

informing the loads of the adjusted transmission power by transmitting system information, RRC signaling, medium access control element signaling, or physical layer signaling; and informing the other small cells of the adjusted transmission power according to backhaul.

6. A small cell comprising:

a memory storing computer-readable program codes; and a processor configured to invoke the computer-readable program codes to:

based on a determination that downlink data needs to be transmitted by the small cell, acquire transmission power of other small cells; and adjust transmission power for transmitting the downlink data according to a load state of the small cell and the transmission power of the other small cells, wherein the load state comprises at least one of service demand of loads, positions of the loads within coverage of the small cell, or the number of the loads, and wherein the computer-readable program codes to adjust the transmission power for transmitting the downlink data further comprise computer-readable program codes invoked by the processor to:

when the small cell is in an off state, based on a determination that a load enters the coverage of the small cell, increase the transmission power of the other cells, or switch the small cell to an on state; and when the small cell is in an on state, based on a determination that the load is near the center of the coverage of the small cell, decrease the transmission power of the small cell, and based on a determination that the number of the loads or the service demand of the loads within the coverage of the small cell decreases, switch at least one of the small cell or the other cells to an off state.

7. The small cell of claim 6, wherein the computer-readable program codes further comprise computer-readable program codes invoked by the processor to:

adjust the transmission power of the small cell for transmitting the downlink data according to a power adjusting request in response to receiving the power adjusting request from the other small cells; and transmit a power adjusting request to the other small cells for adjusting the transmission power of the other small cells when the other small cells transmit other downlink data.

8. The small cell of claim 6, wherein the transmission power of the other small cells is acquired using one of a backhaul signaling and an air interface.

9. The small cell of claim 6, wherein the computer-readable program codes further comprise computer-readable program codes invoked by the processor to:

in response to receiving an instruction for switching from an off state to an on state by the small cell, determine that the downlink data needs to be transmitted.

10. The small cell of claim 6, wherein the computer-readable program codes further comprise computer-readable program codes invoked by the processor to:

inform the loads of the adjusted transmission power by transmitting system information, RRC signaling, medium access control element signaling or physical layer signaling; and inform the other small cells of the adjusted transmission power according to backhaul.

11. A non-transitory machine-readable storage medium having stored thereon computer-readable program codes executable by a small cell to:

in response to receiving an instruction for switching from an off state to an on state by the small cell, determine that downlink data needs to be transmitted, wherein the off state comprises one of a first state, a second state, and a third state, wherein in the first state, the small cell transmits signals in a long period for a load to discover a community, in the second state, the small cell transmits no signal and monitors transmission of surrounding loads, and in the third state, the small cell transmits no signal, monitors no transmission of the surrounding loads, and maintains interaction capability of backhaul signaling;

based on a determination that the downlink data needs to be transmitted by the small cell, acquire transmission power of other small cells; and adjust transmission power for transmitting the downlink data according to a load state of the small cell and the transmission power of the other small cells.

12. The non-transitory machine-readable storage medium of claim 11, wherein the computer-readable programs executable by the small cell further comprises computer-readable programs to:

adjust the transmission power of the small cell for transmitting the downlink data according to a power adjusting request in response to receiving the power adjusting request from the other small cells; and transmit a power adjusting request to the other small cells for adjusting the transmission power of the other small cells when the other small cells transmit other downlink data.

13. The non-transitory machine-readable storage medium of claim 11, wherein the computer-readable programs executable by the small cell further comprises computer-readable programs to:
   detect a change of the load state of the small cell in real time; and
   adjust the transmission power for transmitting the downlink data according to the change of the load state.

14. The non-transitory machine-readable storage medium of claim 11, wherein the load state comprises at least one of service demand of loads, positions of the loads within coverage of the small cell, or the number of the loads.

15. The non-transitory machine-readable storage medium of claim 11, wherein the computer-readable programs executable by the small cell further comprises computer-readable programs to:
   inform the loads of the adjusted transmission power by transmitting system information, RRC signaling, medium access control element signaling or physical layer signaling; and
   inform the other small cells of the adjusted transmission power according to backhaul.

\* \* \* \* \*